Aug. 17, 1965 R. S. LUNDIN 3,200,915
NO-BACK MECHANISM FOR SMALL SYNCHRONOUS MOTORS
Filed Nov. 20, 1962 2 Sheets-Sheet 1
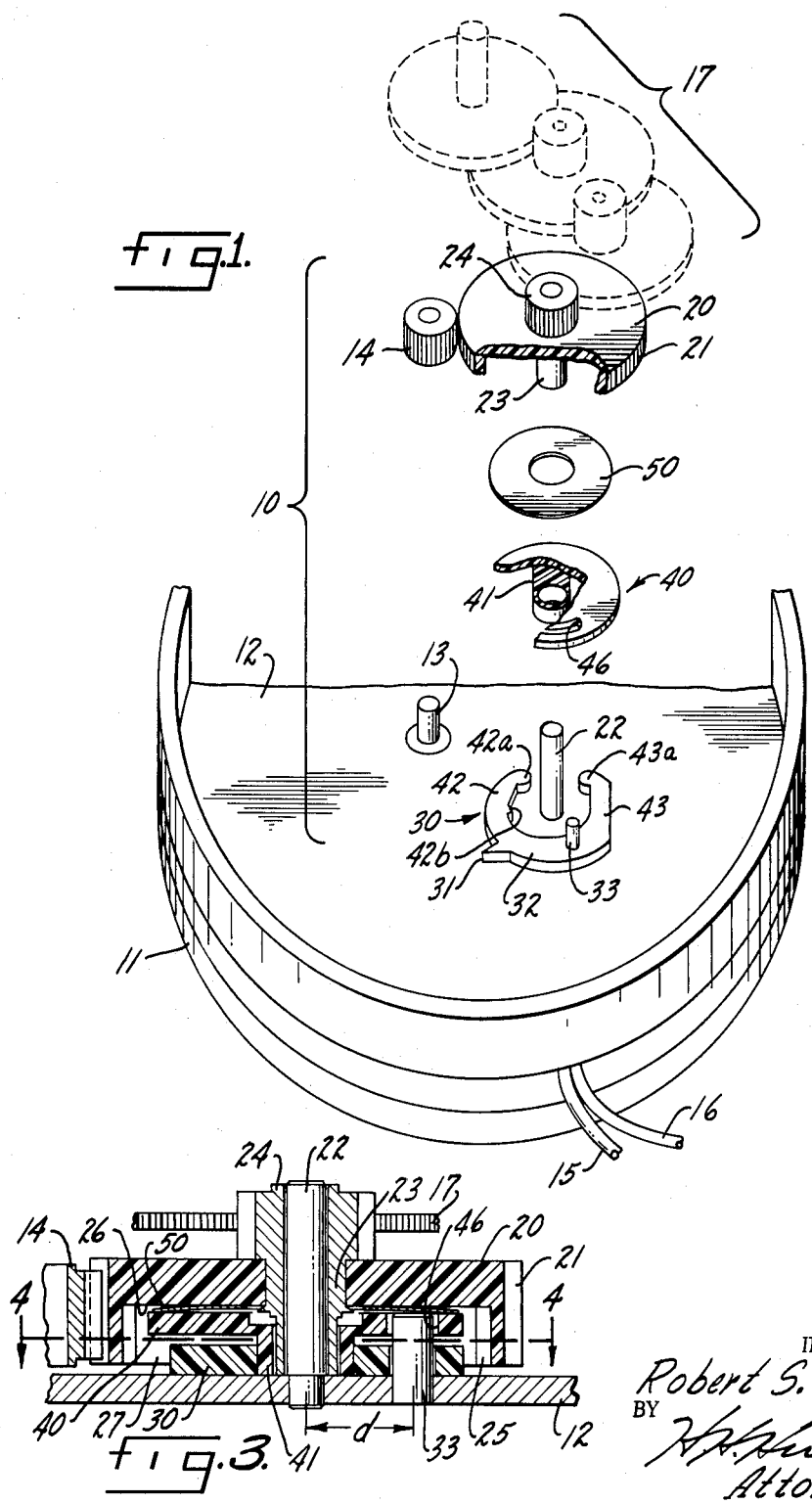
INVENTOR.
Robert S. Lundin,
BY
Attorney.

Aug. 17, 1965     R. S. LUNDIN     3,200,915
NO-BACK MECHANISM FOR SMALL SYNCHRONOUS MOTORS
Filed Nov. 20, 1962     2 Sheets-Sheet 2
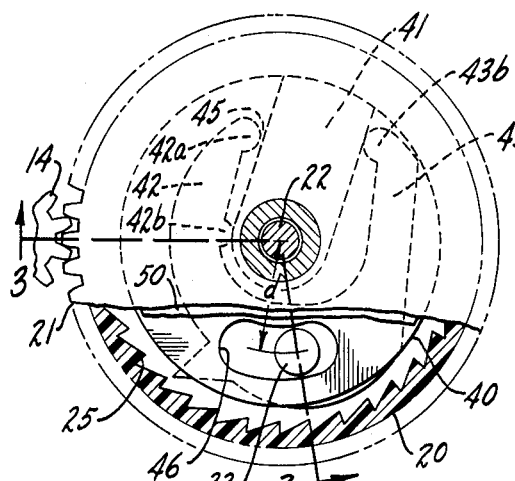
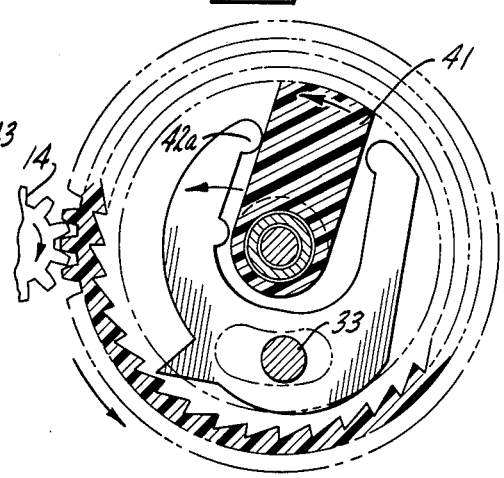
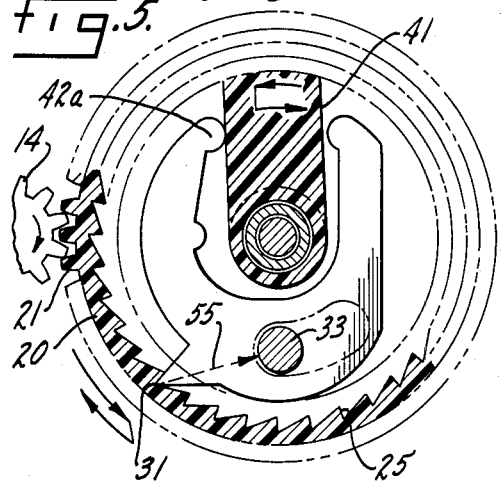
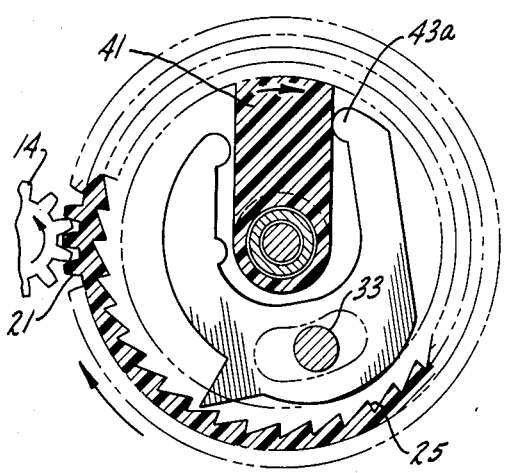
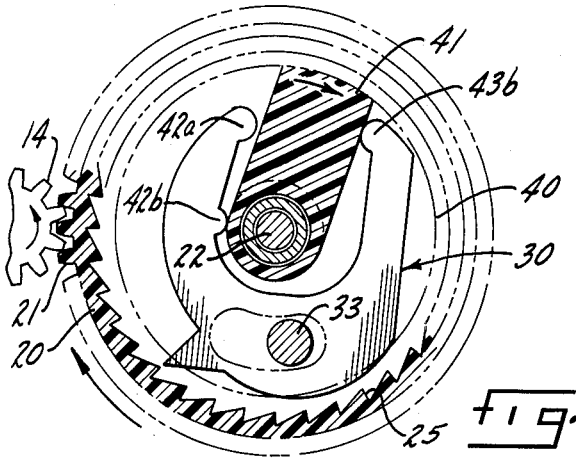
INVENTOR.
Robert S. Lundin,
BY
Attorney.

United States Patent Office 3,200,915
Patented Aug. 17, 1965

3,200,915
NO-BACK MECHANISM FOR SMALL
SYNCHRONOUS MOTORS
Robert S. Lundin, Thomaston, Conn., assignor to General
Time Corporation, Stamford, Conn., a corporation of
Delaware
Filed Nov. 20, 1962, Ser. No. 239,023
5 Claims. (Cl. 192—4)

The present invention relates to a no-back mechanism for use with a small synchronous motor or similar power source capable of starting in either direction for the purpose of insuring unidirectional driving of a connected load.

It is an object of the present invention to provide an improved no-back mechanism which is silent in operation and which is capable of operating reliably and positively over long periods of time. It is a related object to provide a no-back mechanism which does not affect the operation of the associated motor upon starting in the "right" direction but which produces a well defined rebound upon starting in the "wrong" direction so that the motor receives a positive impulse in the direction of correct rotation.

It is another object of the present invention to provide a no-back mechanism for use in the "first gear" of a gear train and which may therefore be used with existing motors without modification. It is also an object to provide a no-back mechanism which is highly compact and which can be supplied integral with a customer-specified gear train without any substantial increase in space requirements.

It is a further object to provide a no-back mechanism which permits clockwise or counterclockwise rotation of the output shaft with minimum modification, requiring only the substitution of a driven gear having ratchet teeth oriented in the opposite direction and which utilizes the same pawl and pawl operator regardless of direction of rotation.

Finally it is an object of the invention to provide a no-back mechanism which employs a small number of simply formed parts which need not be held to close tolerances and which can be economically molded of wear resistant plastic at low expense.

Other objects and advantages of the invention will become apparent upon reading the attached detailed description and upon reference to the drawings in which:

FIGURE 1 is an exploded perspective, partially diagrammatic, of a no-back mechanism constructed in accordance with the present invention in association with a synchronous motor;

FIG. 2 is a top view, in partial section, of the no-back mechanism of FIG. 1;

FIG. 3 is a sectional elevation taken along the line 3—3 in FIG. 2;

FIG. 4 is a horizontal section, partially in phantom, taken along the line 4—4 in FIG. 3 and forming the first step of a typical no-back cycle;

FIG. 5 is a view similar to FIG. 4 showing the blockage of further rotation in the "wrong" direction;

FIG. 6 is a view similar to FIG. 5 showing the effect of rebound with the tip of the pawl being retracted from the ratchet wheel;

FIG. 7 shows the position of the parts under normal and continued driving in the right direction.

While the invention has been described in connection with a preferred embodiment, it will be understood that I do not intend to be limited to the details shown but intend to cover the various alternative and equivalent constructions included within the spirit and scope of the appended claims.

Turning now to FIGS. 1–3, a no-back mechanism indicated generally at 10 is associated with a small synchronous driving motor 11 having a frame plate 12 through which projects a motor output shaft 13 carrying a motor pinion 14. Current is supplied to the motor by leads 15, 16 connected to the regular A.-C. supply line. The speed is reduced to a desired value by a gear train 17.

The motor may, for example, be of the type disclosed in co-pending Lundin and Nebiolo application, Ser. No. 223,387, filed September 13, 1962. Briefly stated the motor employs a magnetic structure providing interspaced poles of opposite but alternating polarity cooperating with an armature having permanent spots of magnetism on its periphery integrally related to the number of poles. Such a motor, being free of shading windings, develops a high torque per unit of volume. While self-starting, the direction of rotation upon starting is dependent upon the polarity of the line voltage at the instant power is applied. The no-back mechanism 10 disclosed herein insures that if the motor starts in the "wrong" direction, the rotation will be immediately blocked for rebound, and continued rotation, in the "right" direction.

In accordance with the present invention a driven gear is provided which meshes with the motor pinion and which has a set of internal ratchet teeth co-operating with an eccentrically pivoted pawl, with friction coupling means between the driven gear and pawl so that the pawl is rocked into blocking position in the event that the motor begins to rotate in the "wrong" direction and with the pawl being retracted, as a result of rebound, for normal and continued rotation of the motor in the "right" direction. More specifically in accordance with the present invention there is provided a frictionally driven pawl operator interposed between the driven gear and the pawl forming a torque-transmitting lost motion connection between the operator and the pawl for insuring decisive and reliable pawl operation. Thus, turning to the drawings, there is provided a driven gear 20 having a set of teeth 21 which run in mesh with the teeth on the motor pinion 14. The gear 20 is journalled for rotation on a stub shaft 22 which is fixedly mounted, preferably upon the frame plate 12 of the motor. Telescoped into the gear 20, and staked to it, is a central hub 23 which carries an output pinion 24 at its outer end meshing with the next gear in the gear train 17. Preferably the gear 20 is of hollow construction having a set of internal ratchet teeth 25 and recessed undersurface 26 defining a central space 27 which contains the pawl and associated parts.

For the purpose of engaging the ratchet teeth 25 upon rotation of the motor in the "wrong" direction, a pawl 30 is provided having a tip 31 and a body 32. The pawl is mounted for rocking movement about a pawl pivot pin 33 which is staked to the frame plate 12 and which is received in a hole formed in the body of the pawl. The pawl pin 33 is eccentrically positioned with respect to the axis of the gear 20 and ratchet teeth, in the present instance by a distance "d," so that rocking of the pawl in one direction, here counterclockwise, moves the tip of the pawl into blocking engagement with the ratchet teeth whereas rocking in the opposite or clockwise direction causes the pawl to be moved clear of the ratchet teeth.

In order to rock the pawl in its two directions a pawl operator 40 is provided which is preferably pivoted on the hub 23 of the gear and which has a torque-transmitting lost motion connection with the pawl. In the present instance the pawl operator 40 is in the form of a disc having an integral arm or boss 41 formed on its underside, with the body of the pawl being provided with means for straddling the opposite sides of the arm. Thus in the present instance the body 32 of the pawl is made of U shape, having a first leg 42 and a second leg 43 lying on opposite sides of the arm 41 of the pawl operator. Thus when the operator is rotated counterclockwise, the left-hand leg 42 is engaged causing the pawl tip 31 to move into blocking engagement with the ratchet teeth whereas when the arm 41 is rotated clockwise, the right hand leg 43 of the pawl is engaged causing the pawl tip 31 to be rocked clear of the ratchet teeth. To insure localized engagement between the arm 41 and the left hand side of the pawl, a protuberance or abutment 42a is provided at the tip of the leg 42. Similarly, to provide localized contact with the leg 43, an abutment 43a is provided at the tip of the leg 43. It is to be noted that the abutments 42a, 43a do not closely embrace the arm 41 on the operator but instead are spaced to provide clearance as indicated at 45 resulting in lost motion between the elements. This clearance and the localized engagement provided by the abutments 42a, 43a, results in several advantages. In the first place it will be appreciated that the pawl operator and pawl are not concentric but are pivoted about pins 22, 33 which are spaced from one another. Consequently the lost motion connection accommodates the relative skewing between the pawl operator and pawl when the operator is turned in one direction or the other. Moreover, as will be discussed, the lost motion insures that the motor will have opportunity to develop a certain amount of speed, or at least break away from its stopped condition, before it is called upon to do mechanical work in moving the pawl. Because of the relative movement which must take place between the pawl operator and pawl, the pawl operator is provided with an arcuate opening or cutout 46 to provide clearance for the pawl pivot pin 33.

In accordance with one of the aspects of the invention a stop is provided between the pawl and pawl operator for limiting the extent of retraction of the pawl tip. In the present instance this function is performed by a "stop" protuberance 42b integrally formed on the leg 42 of the pawl and which engages the hub at the inner end of the arm 41 of the pawl operator.

To provide a frictional drag between the gear 20 and the pawl operator 40, a spring washer 50 is provided interposed between them. This washer is formed of light gauge spring stock arcuately bent out of its plane so that the washer bears on the underside 26 of the gear and on the top side of the operator. The disc shape of the operator 40 provides a circularly "continuous" surface area for engagement by the spring.

While the parts described above may be made of suitable metal, it is preferred to form the driven gear 20, the pawl 30, and the pawl operator 40 of molded "Delrin" plastic, commercially available from E. I. du Pont de Nemours, because of good wear properties and low coefficient of friction combined with good elasticity, relative hardness and dimensional stability. It is found that this material, or equivalent, is suitable even when the no-back mechanism is of extremely small size; for example, the driven gear may have a diameter as small as ⅝ in., or even smaller, thereby permitting extremely compact construction—yet the device is capable of operating over long periods of time without "rounding" of the ratchet teeth or the tip of the pawl, either of which would invite a malfunction.

While the operation of the device will be apparent from the foregoing description, nevertheless it will be helpful to trace through a typical rebound cycle. It will be assumed that the motor, when power is first applied, rotates in the "wrong" direction i.e., a direction to produce counterclockwise rotation of the driven gear 20. This causes the pawl operator 40, under the frictional drag of the spring 50, to rotate counterclockwise as shown in FIG. 4. Engagement between the arm 41 of the operator and the protuberance 42a on the pawl body, as shown in FIG. 5, causes the pawl to rock counterclockwise about its pivot pin 33 so that the pawl tip 31 moves into interference with the ratchet teeth 25. This causes a high impact force to be applied between the engaged pawl tooth and the pawl pivot pin 33 along the line 55, preventing any further rotation of the driven gear and the motor pinion which is in mesh with it. Movement of the pawl, though prompt, takes a finite length of time, long enough for the motor armature to acquire substantial stored energy in the form of momentum. This insures that the pawl is fully seated or "bottomed" in the ratchet teeth. Moreover, when blockage occurs the driven gear and pawl member are both resiliently stressed. This results in a positive rebound of the blocked motor armature in the opposite or "right" direction.

Thus, upon reversal of the motor armature, the arm 41 of the pawl operator, by reason of the drag imposed by the friction spring 50, rotates in the clockwise direction as shown in FIG. 6. The arm 41 thus leaves the protuberance 42a and engages the opposite or unlocking protuberance 43a. Because of the lost motion connection, the motor armature achieves a certain amount of speed in the "right" direction before protuberance 43a is engaged, (in other words, before it is called upon to mechanically move the pawl from its locking to its unlocked position. Upon continued movement, the pawl operator is thus effective to rock the pawl member into the position shown in FIG. 7 where the tip of the pawl is clear of the ratchet teeth. Engagement of the stop 42b with the hub portion of the pawl operator insures that the pawl does not move too far in the unlocking direction. Hence the motor continues to rotate in the "right" direction without any further interference. While it is true that the friction spring 50 interposes a constant drag upon the driven gear 20 as the latter rotates in the "right" direction, it will be understood that the spring is of extremely light construction so that the amount of power consumed by friction is negligible.

It is one of the features of the present device that it is substantially noiseless in operation. The only noise which occurs is that due to the initial impact between the tip of the pawl and the engaged one of the ratchet teeth. Particularly where a plastic material is utilized for the engaging parts, the result is only a fleeting click, hardly perceptible. The present no-back arrangement is therefore to be contrasted with similar devices employing constant ratcheting of engaged parts.

It is a further feature of the present invention that the same mechanism may be employed to secure rotation in either the clockwise or counterclockwise direction simply by replacing the driven gear with one having internal ratchet teeth facing in the opposite direction and by inverting the pawl member. The stop 42b on the pawl functions equally well regardless of the selected direction of rotation.

Since the no-back function is "down stream" of the motor pinion and since the mechanism forms an integral part of the driving gear train, it will be apparent that a "standard" motor may be employed for many different customer applications, quite independently of the gear ratio or direction of rotation which the customer may require. This enables substantial economies in motor manufacture, making it possible to produce a compact unidirectional drive having high torque capability at a low cost. The combination of a motor and no-back constructed in accordance with the present invention may be utilized for programmed switching in various automatic devices and, in fact, wherever a rotative power source is required having a power capability substantially in excess of that usually obtainable with "clock type" synchronous motors.

In the following claims the term "ratchet teeth" will be understood to apply to a series of teeth blockingly engageable by the associated pawl even though the tooth profile may differ somewhat from that shown.

I claim as my invention:

1. In a no-back mechanism for use with a small synchronous motor capable of starting in either direction, the combination comprising a frame, a driven gear having a set of internal ratchet teeth, a pawl having a tip and a body portion with the body portion being pivoted on the frame eccentrically with respect to the driven gear, and operating means interposed between the driven gear and the body of the pawl including a friction connection for rocking the pawl into interfering relation with the ratchet teeth when the gear is rotated in the "wrong" direction for rebound of the gear and connected motor in the "right" direction, the pawl and operating means being totally enclosed within the space within the gear defined by the ratchet teeth.

2. In a no-back mechanism for use with a small synchronous motor having an output pinion and capable of starting in either direction, the combination comprising a frame, a first driven gear journalled in said frame for meshing with the output pinion and having a set of internal ratchet teeth, a pawl included within the confines of said ratchet teeth having a tip and a body portion pivoted on the frame eccentrically with respect to the gear so that the pawl tip is moved in and out of interfering relation with the ratchet teeth upon rocking in opposite directions, and a pawl operator concentrically pivoted with respect to the gear and frictionally coupled to it, said pawl operator and pawl having a torque-transmitting lost motion connection between them so that upon rotation of the gear in the "wrong" direction the pawl tip is rocked into fully-seated interfering engagement with the ratchet teeth causing rebound of the gear and connected motor thereby reversing the direction of rotation of the motor and gear with retraction of the pawl tip from the ratchet teeth so that the motor continues to rotate in the "right" direction.

3. In a no-back mechanism for use with a small synchronous motor capable of starting in either direction, the combination comprising a frame, a driven gear having a shaft journalled on said frame and having a set of internal ratchet teeth defining a central hollow facing the frame, a pawl in said central hollow lying flatly adjacent the frame, said pawl having a tip cooperating with the ratchet teeth and having a body portion pivoted on the frame eccentrically with respect to the driven gear, a pawl operator in said hollow interposed between the pawl and the inside surface of the gear, said pawl operator being pivoted concentrically with respect to the gear and frictionally coupled to the latter, the body of the pawl being U-shaped straddling the shaft and providing a straddling lost motion connection with the pawl operator so that when the pawl operator is rotated in the "wrong" direction incident rotation of the motor in the "wrong" direction, the pawl is rocked into interfering relation with the ratchet teeth for blockage of rotation and for rebound of the motor in the "right" direction accompanied by retraction of the pawl from the ratchet teeth.

4. In a no-back mechanism for use with a small synchronous motor capable of starting in either direction, the combination comprising a frame, a driven gear journalled on said frame and having a set of internal teeth and an adjacent internal annular surface, a pawl included within the confines of said ratchet teeth and pivoted on the frame eccentrically with respect to the gear, and a pawl operator concentrically pivoted with respect to the gear, said pawl operator having an annular surface arranged opposite the annular surface on the gear, a friction member interposed between the surfaces, means providing a torque-transmitting connection between said pawl operator and pawl so that upon rotation of the gear in the "wrong" direction the pawl operator rocks the pawl into fully seated interfering engagement with the ratchet teeth causing rebound of the gear and connected motor thereby reversing the direction of rotation of the motor and gear with retraction of the pawl tip from the ratchet teeth so that the motor continues to rotate in the "right" direction.

5. In a no-back mechanism for use with a small synchronous motor capable of starting in either direction, the combination comprising a frame, a driven gear journalled on said frame having a set of internal ratchet teeth defining a central hollow facing the frame, a pawl in the hollow of the driven gear and having a tip cooperating with the ratchet teeth, said pawl having a body portion pivoted on the frame eccentrically with respect to the driven gear, a pawl operator pivoted concentrically with respect to the gear and frictionally coupled to the latter, the body of the pawl providing a first abutment for engaging the pawl operator so that when the pawl operator is rotated in the "wrong" direction the pawl is rocked into interfering relation with the ratchet for blockage of rotation and for rebound of the motor in the "right" direction accompanied by retraction of the pawl from the ratchet teeth, the body of the pawl having a second abutment for engaging the pawl operator to limit the degree of retraction.

References Cited by the Examiner

UNITED STATES PATENTS

| 2,708,555 | 5/55 | Heineman et al. | 188—82.7 |
| 2,960,201 | 11/60 | Berg | 192—4 |

FOREIGN PATENTS

| 1,080,201 | 4/60 | Germany. |
| 1,102,883 | 3/61 | Germany. |
| 287,925 | 4/53 | Switzerland. |

DAVID J. WILLIAMOWSKY, Primary Examiner.